United States Patent
Glasgow et al.

(10) Patent No.: US 7,432,327 B2
(45) Date of Patent: Oct. 7, 2008

(54) TRANSPARENT POLYMERIC COMPOSITIONS COMPRISING POLYSILOXANE-POLYCARBONATE COPOLYMER, ARTICLES MADE THEREFROM AND METHODS OF MAKING SAME

(75) Inventors: Katherine Glasgow, Evansville, IN (US); Naresh Alle, Slidell, LA (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 282 days.

(21) Appl. No.: 11/026,362

(22) Filed: Dec. 30, 2004

(65) Prior Publication Data

US 2006/0148986 A1 Jul. 6, 2006

(51) Int. Cl.
C08L 83/10 (2006.01)
(52) U.S. Cl. .................................. 525/106; 525/461
(58) Field of Classification Search ............... 525/106, 525/461
See application file for complete search history.

(56) References Cited

U.S. PATENT DOCUMENTS

| | | | |
|---|---|---|---|
| 3,130,177 A | 4/1964 | Grabowski | |
| 3,169,121 A | 2/1965 | Goldberg | |
| 3,511,895 A | 5/1970 | Kydonieus et al. | |
| 3,928,708 A | 12/1975 | Fohlen et al. | |
| 3,961,122 A | 6/1976 | Gaines, Jr. et al. | |
| 3,981,944 A | 9/1976 | Okamoto et al. | |
| 3,988,389 A | 10/1976 | Margotte et al. | |
| 4,074,864 A | 2/1978 | Narita et al. | |
| 4,137,365 A | 1/1979 | Wydeven et al. | |
| 4,154,775 A | 5/1979 | Axelrod | |
| 4,272,584 A | 6/1981 | Goldberg et al. | |
| 4,281,099 A | 7/1981 | Maresca | |
| 4,327,012 A | 4/1982 | Salee | |
| 4,359,506 A | 11/1982 | Wiggins et al. | |
| 4,373,061 A | 2/1983 | Ching | |
| 4,461,868 A | 7/1984 | Lindner et al. | |
| 4,530,965 A | 7/1985 | Bourland | |
| 4,555,384 A | 11/1985 | Morris et al. | |
| 4,569,970 A | 2/1986 | Paul et al. | |
| 4,579,906 A | 4/1986 | Zabrocki et al. | |
| 4,600,632 A | 7/1986 | Paul et al. | |
| 4,654,400 A | 3/1987 | Lohmeijer et al. | |
| 4,696,972 A | 9/1987 | Bourland | |
| 4,746,701 A | 5/1988 | Kress et al. | |
| 4,767,818 A | 8/1988 | Boutni | |
| 4,777,212 A | 10/1988 | Kress et al. | |
| 4,782,115 A | 11/1988 | Paul et al. | |
| 4,788,252 A | 11/1988 | de Boer et al. | |
| 4,810,739 A | 3/1989 | Lindner et al. | |
| 4,826,918 A | 5/1989 | Kress et al. | |
| 4,880,554 A | 11/1989 | Newman et al. | |
| 4,927,880 A | 5/1990 | DeRudder et al. | |
| 4,931,503 A | 6/1990 | Boutni et al. | |
| 4,937,031 A | 6/1990 | Curry | |
| 4,983,658 A | 1/1991 | Kress et al. | |
| 4,997,883 A | 3/1991 | Fischer et al. | |
| 5,017,659 A | 5/1991 | van der Groep | |
| 5,023,297 A | 6/1991 | Boutni | |
| 5,036,126 A | 7/1991 | Rinehart et al. | |
| 5,091,461 A | 2/1992 | Skochdopole | |
| 5,109,076 A | 4/1992 | Freitag et al. | |
| 5,128,409 A | 7/1992 | Gaggar | |
| 5,266,618 A | 11/1993 | Watanabe et al. | |
| 5,322,882 A | 6/1994 | Okamoto | |
| 5,360,861 A | 11/1994 | Campbell | |
| 5,380,795 A | 1/1995 | Gosens et al. | |
| 5,399,644 A | 3/1995 | Wozny et al. | |
| 5,414,045 A | 5/1995 | Sue et al. | |
| 5,430,121 A | 7/1995 | Pudleiner et al. | |
| 5,451,632 A | 9/1995 | Okumura et al. | |
| 5,455,310 A | 10/1995 | Hoover et al. | |
| 5,488,086 A | 1/1996 | Umeda et al. | |
| 5,510,414 A | 4/1996 | Okamoto et al. | |
| 5,521,230 A | 5/1996 | Bhatia et al. | |
| 5,530,083 A | 6/1996 | Phelps et al. | |
| 5,602,201 A | 2/1997 | Fujiguchi et al. | |
| 5,608,026 A | 3/1997 | Hoover et al. | |
| 5,616,674 A | 4/1997 | Michel et al. | |
| 5,714,537 A | 2/1998 | Laughner et al. | |
| 5,723,541 A | 3/1998 | Ingenito et al. | |
| 5,770,652 A | 6/1998 | Richards et al. | |
| 5,783,624 A | 7/1998 | Khanarian et al. | |

(Continued)

FOREIGN PATENT DOCUMENTS

EP 0248308 5/1987

(Continued)

OTHER PUBLICATIONS

Dr. Jochen Schoeps et al.; Moulding Compounds with easy mould releasability; Abstract Dec. 9, 1987.

(Continued)

Primary Examiner—Kuo-Liang Peng

(57) ABSTRACT

A composition made from a transparent polysiloxane-polycarbonate copolymer and styrene-acrylonitrile copolymer (SAN) and, optionally, polycarbonate, the composition being transparent. A thin-walled article may be made from such a composition. A transparent composition made by combining a transparent polysiloxane-polycarbonate copolymer with styrene-acrylonitrile copolymer (SAN) and, optionally, polycarbonate, to produce a transparent composition. An article made by forming a transparent composition comprising a transparent polysiloxane-polycarbonate copolymer, styrene-acrylonitrile copolymer (SAN) and, optionally, polycarbonate into an article.

18 Claims, No Drawings

U.S. PATENT DOCUMENTS

| | | | |
|---|---|---|---|
| 5,821,322 | A | 10/1998 | Brunelle et al. |
| 5,834,542 | A | 11/1998 | Kielhorn-Bayer et al. |
| 5,859,146 | A | 1/1999 | Kielhorn-Bayer et al. |
| 5,910,538 | A | 6/1999 | Padwa et al. |
| 5,932,677 | A | 8/1999 | Hoover et al. |
| 5,962,563 | A | 10/1999 | Forrestal et al. |
| 5,965,655 | A | 10/1999 | Mordecai et al. |
| 5,986,019 | A | 11/1999 | Archey et al. |
| 6,072,011 | A | 6/2000 | Hoover |
| 6,103,810 | A | 8/2000 | Frayer et al. |
| 6,133,360 | A | 10/2000 | Barren et al. |
| 6,252,013 | B1 | 6/2001 | Banach et al. |
| 6,313,254 | B1 | 11/2001 | Meijs et al. |
| 6,458,913 | B1 | 10/2002 | Honigfort et al. |
| 6,465,102 | B1 | 10/2002 | Honigfort et al. |
| 6,545,089 | B1 | 4/2003 | DeRudder et al. |
| 6,576,706 | B1 | 6/2003 | Nodera et al. |
| 6,613,820 | B2 | 9/2003 | Fujiguchi et al. |
| 6,627,724 | B2 | 9/2003 | Meijs et al. |
| 6,657,018 | B1 | 12/2003 | Hoover |
| 6,663,662 | B2 | 12/2003 | Pacetti et al. |
| 6,676,852 | B2 | 1/2004 | Brown et al. |
| 6,716,444 | B1 | 4/2004 | Castro et al. |
| 6,723,864 | B2 | 4/2004 | Silva et al. |
| 6,727,319 | B2 | 4/2004 | Eichenauer |
| 6,833,422 | B2 | 12/2004 | Silva et al. |
| 6,861,482 | B2 | 3/2005 | Brunelle et al. |
| 6,870,013 | B2 | 3/2005 | Silva et al. |
| 2002/0111428 | A1 | 8/2002 | Gaggar et al. |
| 2003/0032725 | A1 | 2/2003 | Gaggar et al. |
| 2003/0092837 | A1 | 5/2003 | Eichenauer |
| 2003/0105226 | A1 | 6/2003 | Cella et al. |
| 2003/0119986 | A1 | 6/2003 | Eichenauer |
| 2003/0139504 | A1 | 7/2003 | Miebach et al. |
| 2003/0181603 | A1* | 9/2003 | Venderbosch et al. ....... 525/461 |
| 2004/0011999 | A1 | 1/2004 | Murray |
| 2004/0039145 | A1 | 2/2004 | Silva et al. |
| 2004/0044105 | A1 | 3/2004 | Webster |
| 2004/0076541 | A1 | 4/2004 | Laughin et al. |
| 2004/0220330 | A1 | 11/2004 | DeRudder et al. |
| 2005/0032988 | A1 | 2/2005 | Silva et al. |
| 2005/0075549 | A1 | 4/2005 | Kondoh et al. |
| 2005/0148719 | A1 | 7/2005 | An et al. |
| 2005/0159577 | A1 | 7/2005 | Davis et al. |
| 2006/0014919 | A9* | 1/2006 | Venderbosch et al. ....... 528/196 |
| 2006/0030647 | A1 | 2/2006 | Ebeling et al. |

FOREIGN PATENT DOCUMENTS

| | | |
|---|---|---|
| EP | 0376052 | 7/1990 |
| EP | 0434848 B1 | 7/1991 |
| EP | 0254054 B1 | 11/1992 |
| EP | 0517927 A1 | 12/1992 |
| EP | 0520186 | 12/1992 |
| EP | 0272425 | 1/1993 |
| EP | 0522753 A2 | 1/1993 |
| EP | 0524731 B1 | 1/1993 |
| EP | 0 537 577 A1 | 4/1993 |
| EP | 0 600 196 A1 | 6/1994 |
| EP | 0645422 | 3/1995 |
| EP | 520186 | 12/1997 |
| EP | 1331246 | 7/2003 |
| EP | 1162235 | 12/2003 |
| GB | 1356685 | 6/1974 |
| WO | WO 80/00084 A1 | 1/1980 |
| WO | WO 9946326 A1 | 9/1999 |
| WO | WO 01/72905 A2 | 10/2001 |
| WO | WO 02/50185 | 6/2002 |
| WO | WO 03/025060 | 3/2003 |
| WO | WO 03/025061 | 3/2003 |
| WO | WO 2004/076541 A2 | 9/2004 |
| WO | 2005037921 | 4/2005 |
| WO | 2005075549 | 8/2005 |
| WO | 2005075568 | 8/2005 |

OTHER PUBLICATIONS

Dr. Werner Nouvertne et al.; Blends of Polydiorganosiloxane-polycarbonate-block Concondensates with Siloxanes and with Elastomeric Polymerisation Products; Abstract Sep. 19, 1990.
Umeda Takashi et al.; Polycarbonate Resin Composition; Abstract Dec. 27, 1990.
Masuki tatsuya et al.; Polycarbonate Resin; Abstract Jun. 28, 1996.
Saito Akihiro et al; Flame-Retardant Resin Composition; Abstract Oct. 22, 1992.
Sakano Hajime et al.; Thermoplastic Resin Composition; Abstract Jan. 22, 1983.
Watanabe Akihiro et al.; Impact-Resistant Resin Composition; Abstract Mar. 28, 1995.
International Search Report; International Application No. PCT/US2005/046857; Date of Mailing: May 16, 2006 (7 pgs).
International Search Report for International Application No. PCT/US2004/041947, mailed Apr. 22, 2005, 3 pages.
JP04-249537, Glass-Reinforced Polycarbonate Resin Composition, Abstract Only, 1 page.
JP05-255583, Polycarbonate Resin Composition, Abstract Only, 1 page.
JP06-184424, Polycarbonate Resin Composition, Abstract Only, 1 page.
JP06-212070, Reinforced Aromatic Polycarbonate Resin Composition, Abstract Only, 1 page.
JP06-228424, Reinforced Aromatic Polycarbonate Resin Composition, Abstract Only, 1 page.
JP09-040856, Glass-Reinforced Polycarbonate Resin Composition, Abstract Only, 1 page.
International Search Report for International Application No. PCT/US2005/044519, mailed May 11, 2006, 5 pages.
International Search Report for International Application No. PCT/US2006/007372, mailed Jul. 19, 2006, 6 pages.
European Search Report for European Application No. 05255053, dated Nov. 28, 2005, 4 pages.
Nakao, et al., "High Performance Plastic Substrate for Flat Panel Displays," The 10th International Display Workshop, Fukuoka, Japan (Dec. 3-5, 2003) 621-624.
International Search Report for International Application No. PCT/US2005/035432, mailed Feb. 3, 2006, 7 pages.
EP 0206006, Thermoplastic Moulding Compositions Having a Particular Strength of Their Coalescence Seams, Abstract Only, 1 page.
ASTM D1003-61 "Standard Test Method for Haze and Luminous Transmittance of Transparent Plastics" 6 pgs, Nov. 1961.
ASTM D1238-04 "Standard Test Method for Melt Flow Rates of Thermoplastics by Extrusion Plastometer" 13 pgs, Apr. 2004.
ASTM D256-04 "Standard Test Method for Determining the Izod Pendulum Impact Resistance of Plastics" 20 pgs, Jun. 2004.
Japanese Patent No. JP 04-225062, abstract only, Aug. 1992.
Japanese Patent No. JP 3065177, abstract only, Mar. 1991.
Japanese Patent No. JP 56-014549, abstract only, Feb. 1981.
Japanese Patent No. 1989-199841, Patent No. JP10309278 abstract only, Mar. 1991.
European Search Report for European Application No. EP 05254891, mailed Nov. 15, 2005.
Yamakawa, et al. "Infulence of Acrylonitrile-Butadiene-Styrene (ABS) Morphology and Poly (styrene-co-acrylonitrile) (SAN) Content on Fracture Behavior of ABS/SAN Blends" Journal of Applied Polymer Science, vol. 92, 2606-2611, date unknown.

* cited by examiner

TRANSPARENT POLYMERIC COMPOSITIONS COMPRISING POLYSILOXANE-POLYCARBONATE COPOLYMER, ARTICLES MADE THEREFROM AND METHODS OF MAKING SAME

BACKGROUND

The transparency of polycarbonates makes them useful in a variety of products. However, the processing characteristics of the polycarbonates and the physical properties they impose on the finished products make it desirable to blend the polycarbonates with other polymeric materials such as a styrene-acrylonitrile copolymer (SAN), e.g., to improve the flow and processability, and/or acrylonitrile-butadiene-styrene graft copolymer (ABS), to improve the flow characteristics and low temperature impact resistance. However, even at relatively low SAN levels, a polycarbonate/SAN blend can be hazy or opaque. Polycarbonate/ABS blends are often hazy or opaque as well.

There is a need in the art for transparent, SAN-containing polymeric compositions.

SUMMARY

A composition comprising a transparent polysiloxane-polycarbonate copolymer and styrene-acrylonitrile copolymer (SAN) and, optionally, polycarbonate, the composition being transparent.

A thin-walled article may comprise such composition.

A method for making a composition consists essentially of combining a transparent polysiloxane-polycarbonate copolymer with styrene-acrylonitrile copolymer (SAN) and, optionally, polycarbonate, to produce a transparent composition.

A method for making an article comprises making a composition by combining a transparent polysiloxane-polycarbonate copolymer, styrene-acrylonitrile copolymer (SAN) and, optionally, polycarbonate, and forming the composition into an article.

DETAILED DESCRIPTION

Compositions are described herein that comprise blends of polysiloxane-polycarbonate copolymer and SAN that are transparent. These compositions are processable (i.e., can be blended, extruded, and/or molded, etc.) into useful articles which exhibit desirable physical characteristics such as tensile strength, impact resistance, and so on, as demonstrated by the data herein. Optionally, such transparent compositions may comprise polycarbonate as well. A composition having a % light transmission of at least 55% and a haze of not more than 45% is deemed to be transparent, wherein % light transmission means the ratio of transmitted light to incident light directed onto a specimen comprising the composition molded into a 3.18 millimeter (0.125 inch) thick chip, determined in accordance with Method E 308 (ASTM D 1003-61), and "haze" means that percentage of transmitted light which, in passing through the specimen, deviates from the incident beam by forward scattering, determined in accordance with ASTM D 1003-61.

The polysiloxane-polycarbonate copolymer in the compositions is transparent, meaning it has a light transmission greater than or equal to 55%. The polysiloxane-polycarbonate copolymer may have a light transmission greater than or equal to 60% or more specifically greater than or equal to 70%. The polysiloxane-polycarbonate copolymer also has a haze less than or equal to 45%, preferably less than or equal to 25%, and most specifically less than or equal to 10%. In some embodiments, transparent polysiloxane-polycarbonate copolymer comprises less than 20% siloxane by weight (wt %) of the copolymer, optionally 2 wt % to 10 wt %, or in some embodiments, 4 wt % to 8 wt % siloxane. In one embodiment, a transparent polysiloxane-polycarbonate copolymer comprises 6 wt % siloxane by weight of the copolymer. Without being bound by theory, it is believed that the transparency of the polysiloxane polycarbonate copolymer is related to the size, the distribution or a combination of the size and distribution of the polysiloxane units throughout the copolymer. The polysiloxane units and polycarbonate units may each be distributed randomly, non-randomly, or a combination of randomly and non-randomly along the polymer chain or backbone. In a specific embodiment, the polysiloxane units and polycarbonate units are dispersed in the polymer chain as a combination of randomly and non-randomly distributed units.

Compositions described herein comprise polysiloxane-polycarbonate copolymer and 0.1% to 50% SAN by weight (wt %), e.g., by weight of the polysiloxane-polycarbonate copolymer plus SAN, optionally more than 0.5 wt % SAN or, in some embodiments, at least 1 wt % SAN. For example, a transparent composition as described herein may comprise 1 wt % to 20 wt % SAN or, alternatively, 5 wt % to 15 wt % SAN. In illustrative embodiments, compositions may comprise 10 wt % to 15 wt % SAN.

Optionally, the composition may comprise polycarbonate. As used herein, the term 'polycarbonate' alone does not encompass polysiloxane-polycarbonate copolymer.

Some compositions may comprise at least 50% by weight (wt %) polysiloxane-polycarbonate copolymer, e.g., at least 50% polysiloxane-polycarbonate copolymer by weight of polysiloxane-polycarbonate copolymer plus SAN plus polycarbonate (if any). Optionally, the composition may comprise at least 0.1 wt % polycarbonate e.g., 0.1 wt % to 49.9 wt % or, in some embodiments, less than 45 wt %, e.g., 5 wt % to 20 wt % polycarbonate. As used herein, wt % of polysiloxane-polycarbonate copolymer, SAN or polycarbonate in the composition is based on the combined weight of the polysiloxane-polycarbonate copolymer, SAN and, if present, the polycarbonate, exclusive of other additives or fillers.

Polycarbonate and polysiloxane-polycarbonate copolymers comprise polycarbonate units, comprising repeating structural units of the formula (1):

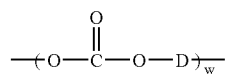
(1)

in which at least 60 percent of the total number of D groups are aromatic organic radicals and the balance thereof are aliphatic, alicyclic, or aromatic radicals, and w is at least 1. In one embodiment, each D is an aromatic organic radical, for example a radical of formula (2):

$$-A^1-Y^1-A^2-$$ (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, and $C_{1-18}$ alkylene, including methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

The polycarbonate units may be derived from the interfacial reaction of a carbonate precursor with a dihydroxy compound having the formula HO-D-OH, which includes dihydroxy compounds of formula (3):

$$HO-A^1-Y^1-A^2-OH \qquad (3)$$

wherein $Y^1$, $A^1$ and $A^2$ are as described above. Also included are bisphenol compounds of general formula (4):

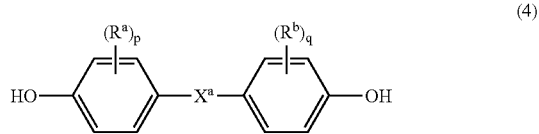

(4)

wherein $R^a$ and $R^b$ each represent a halogen atom, heteroatom-containing monovalent hydrocarbon group, or a monovalent hydrocarbon group, and may be the same or different; p and q are each independently integers of 0 to 4; and $X^a$ represents one of the groups of formula (5):

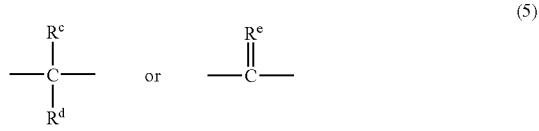

(5)

wherein $R^c$ and $R^d$ each independently represent a hydrogen atom or a monovalent linear or cyclic hydrocarbon group and $R^e$ is a divalent hydrocarbon group.

D may also be a divalent $C_{6-20}$ aromatic radical derived from a dihydroxy compound of formula (6):

(6)

wherein each $R^2$ is independently a halogen atom, a $C_{1-12}$ alkyl group, or a $C_{1-10}$ halogen-substituted alkyl group, and t is 0 to 4. The halogen may be fluorine, chlorine, or bromine. Alkyl groups, if present, are in various embodiments straight-chain, branched or cyclic alkyl groups, and are most often located in the ortho position to both oxygen atoms, although other ring locations are contemplated. Suitable $C_{1-12}$ alkyl groups include, but are not limited to, methyl, ethyl, n-propyl, isopropyl, butyl, iso-butyl, t-butyl, nonyl, decyl, dodecyl and aryl-substituted alkyl, including benzyl. In a particular embodiment a suitable alkyl group is methyl.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used.

Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. An effective amount of a phase transfer catalyst, such as tetra-n-butylammonium chloride, may be 0.1 to 10 wt %, specifically 0.5 to 2 wt %, based on the weight of dihydroxy entities in the phosgenation mixture.

Branched polycarbonate units may also be formed, as well as combinations of a linear polycarbonate unit and a branched polycarbonate unit. The branched polycarbonates may be prepared by adding a branching agent during polymerization to form the polycarbonate unit. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of 0.05 wt % to 2.0 wt %.

In addition to the repeating structural carbonate units (1), the polysiloxane-polycarbonate copolymers comprise polydiorganosiloxane units (sometimes referred to herein as 'siloxane') comprising repeating structural units of formula (7):

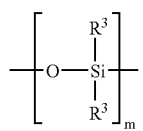

(7)

wherein each occurrence of R3 may be the same or different and is selected from $C_{1-13}$ monovalent organic radicals. The diorganosiloxane units are generally present in the form of blocks containing 1 to 1000 units, specifically 10 to 100, more specifically 25 to 75, and most specifically 40 to 60. As is readily understood by one of ordinary skill in the art, m represents an average value. In one optional embodiment, the siloxane portion of the copolymer comprises polydimethylsiloxane (PDMS).

A specific type of suitable polysiloxane-polycarbonate copolymer (also known as a poly(siloxane-carbonate) or a poly(carbonate-siloxane) copolymer) has polydiorganosiloxane units comprising repeating structural units of formula (8):

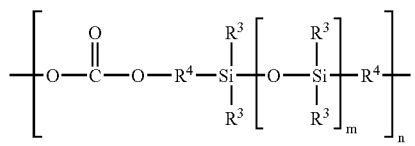

(8)

wherein $R^3$ and m are as described above, and each occurrence of $R^4$ is independently $C_1$-$C_{30}$ hydrocarbylene, and n is at least one. In one embodiment, each occurrence of $R^4$ independently has structure (9):

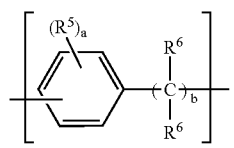

(9)

wherein each occurrence of $R^6$ is independently H or $C_1$-$C_{12}$ hydrocarbyl; each occurrence of $R^5$ is independently halogen, $C_1$-$C_8$ hydrocarbyl, or $C_1$-$C_8$ hydrocarbyloxy; a is 0 to 4; b is 1 to 12, and b is 0 or greater. A hydrogen atom occupies any phenylene ring position not substituted with $R^5$. In one embodiment, the aryl end has connectivity to an oxygen atom, and the alkyl end has connectivity to a silicon atom. In another embodiment, each occurrence of $R^4$ independently is a $C_6$-$C_{30}$ arylene radical that is the residue of a diphenol. In another embodiment, the oxygen substituent may be disposed ortho, meta, or para to the —$C(R^6)_2$— group. It will be recognized by one skilled in the art that a polysiloxane unit terminating in hydroxyalkyl or hydroxyaryl end groups comprises a high-molecular weight or a lower molecular weight oligomeric diol, and will react with a carbonyl source to form a polycarbonate under the same general conditions as used with diols or dihydroxy compounds as described above.

A specific type of suitable polysiloxane polycarbonate copolymer (also known as a poly(siloxane-carbonate) or a poly(carbonate-siloxane) copolymer) comprises units of formula (10):

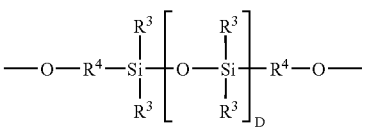

(10)

wherein $R^3$ is as described above, D is 1 to 1000, each occurrence of $R^4$ is independently a divalent $C_1$-$C_{30}$ hydrocarbon, and wherein the polymerized unit is the reaction residue of its corresponding diol. In one embodiment, each occurrence of $R^4$ independently has structure (11):

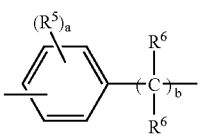

(11)

wherein each occurrence of $R^6$ is independently H or $C_1$-$C_{12}$ hydrocarbyl. Each $R^5$ in formula (11) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, and b is 1 to 8. Each a is independently 0, 1, 2, 3, or 4, and when a is less than 4, a hydrogen is substituted to the aromatic ring such that the total number of hydrogens on the aromatic ring is 4-a. In one embodiment, the aryl end has connectivity to an oxygen atom, and the alkyl end has connectivity to a silicon atom. In another embodiment, the oxygen substituent may be disposed ortho, Meta, or para to the —$C(R^6)_2$— group.

In a specific embodiment, the polysiloxane units comprise repeating structural units of the formula (12):

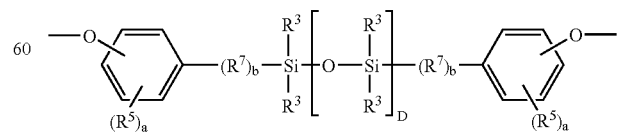

(12)

wherein R3, D, and R5 are as described above, R7 is a divalent organic radical preferably disposed in the ortho or para position relative to the backbone oxygen, and wherein the polymerized unit is the reaction residue of its corresponding diol. For example, R7 may be a C1-C13 alkylene, C1-C13 alkyleneoxy, C2-C13 alkenyl, C2-C13 alkenyloxy, C3-C6 cycloalkylene, C3-C6 cycloalkleneoxy, C6-C10 arylene, C6-C10 aryleneoxy, C7-C13 aralkylene, C7-C13 aralkyleneoxy, C7-C13 alkarylene, or C7-C13 alkaryleneoxy, and b is 1-8. Combinations of the foregoing R7 groups may be used in the same copolymer. In one embodiment, each R3 in formula (12) may be the same or different, and is selected from the group consisting of C1-8 alkyl and C6-13 aryl; a is one; each R5 is a C1-3 alkoxy; b is one; and each R7 is a C1-C13 alkylene. In another specific embodiment, each R3 is a C1-C3 alkyl; each R5 is a C1-C3 alkoxy or a C1-C3 alkyl; a is one; b is one; and each R7 is a dimethylene, trimethylene or tetramethylene. In another embodiment, each R3 is methyl, each R5 is methoxy, a is 1, b is one, and each R7 is a divalent C1-C3 aliphatic group.

Other examples of suitable polyosiloxane units include those described in U.S. Pat. No. 4,746,701 to Kress et al., which is incorporated herein by reference. Specifically, the polysiloxane block may be derived from a polydiorganosiloxane having the structure shown below.

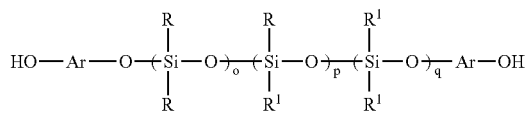

wherein the radicals Ar are identical or different arylene radicals from diphenols with preferably 6 to 30 carbon atoms; R and $R^1$ are identical or different and denote linear alkyl, branched alkyl, halogenated linear alkyl, halogenated branched alkyl, aryl or halogenated aryl, but preferably methyl, and the number of the diorganosiloxy units (the sum o+p+q) is about 5 to about 120.

The polysiloxane polycarbonate copolymer may be manufactured by reaction of the corresponding dihydroxy polysiloxane with a carbonate source and a dihydroxy aromatic compound of formula (4) or (6), optionally in the presence of a phase transfer catalyst as described above. Among the specific phase transfer catalysts that can be used as catalysts of the formula $(R)_4Q^+X$, wherein each R is, in this instance, the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, $CH_3[CH_3(CH_2)_2]_3NX$ wherein X in this instance is $Cl^-$, $Br^-$, or a $C_{1-8}$ alkoxy group or $C_{6-18}$ aryloxy group. An effective amount of a phase transfer catalyst may be 0.1 wt % to 10 wt % based on the weight of dihydric reactant in the phosgenation mixture. In another embodiment an effective amount of phase transfer catalyst may be 0.5 wt % to 2 wt % based on the weight of bisphenol in the phosgenation mixture. One or both of the tube reactor processes described in U.S. Patent Application No. 2004/0039145A1 or the process described in U.S. Pat. No. 6,723,864 may be used to synthesize the polysiloxane-polycarbonate copolymers.

Alternatively, the polysiloxane-polycarbonate copolymers may be prepared by co-reacting in a molten state, a dihydroxy-terminated polysiloxane, dihydroxy compound (5) and a diaryl carbonate ester, such as diphenyl carbonate, in the presence of a transesterification catalyst as described above.

A hydroxyaryl-terminated polysiloxane can be made by effecting a platinum catalyzed addition between an aliphatically unsaturated monohydric phenol and a siloxane of the formula (13):

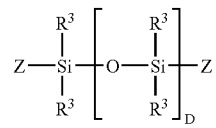

(13)

wherein $R^3$ and D are as previously defined, and Z is H. Some of the aliphatically unsaturated monohydric phenols that can be used to make the hydroxyaryl-terminated poly(diorganosiloxane)s are, for example, 4-allyl-2-methoxy phenol (eugenol), 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 2-allyl-4,6-dimethylphenol, and the like.

A hydroxyaryl-terminated polysiloxane can also be prepared by the condensation of hydride-terminated polysiloxane (13), wherein $R^3$, D, and Z are as defined above, with a halomethyl- or sulfonatomethylene-substituted aryl in the presence of a base or copper catalyst, followed by the removal of any hydroxyl protecting group used, such as acetate or trimethylsilyl. Suitable halomethyl- or sulfonatomethylene-substituted aryls of this type include 4-acetoxybenzyl chloride, 4-trimethylsilylbenzyl chloride, 4-methoxymethyloxybenzyl chloride, 4-acetoxybenzyl toluenesulfonate, 4 trimethylsilylbenzyl toluenesulfonate, and the like.

A hydroxyaryl-terminated polysiloxane can also be prepared by the condensation of polysiloxane (13), wherein $R^3$ and D are as defined above and Z is acetoxy or halogen, with a dihydroxy compound as described above, and in the presence of a base.

Generally, the amount of reactive polysiloxane is selected so as to produce a copolymer comprising a molar ratio of polysiloxane units of formula (13) to carbonate units of 1:99 to 60:40, more specifically 2:98 to 50:50. The values of D and the relative molar ratio of the polysiloxane units of formula (10) to the carbonate units are selected so as to provide an effective levels of transparency, melt viscosity and other desired characteristics to the thermoplastic composition. The values of D and the molar ratios of polysiloxane:carbonate units will therefore vary depending on the type and relative amount of each component in the thermoplastic composition, including the type and amount of polycarbonate, SAN, and other additives. Where D is of a lower value, e.g., less than 40, it may be desirable to use a relatively larger amount of the polysiloxane units. Conversely, where D is of a higher value, e.g., greater than 40, it may be desirable to use a relatively smaller amount of the polysiloxane units.

Generally, the polysiloxane-polycarbonate copolymer may comprise 70 wt % to 99 wt % of carbonate units and 1 wt % to 30 wt % dimethylsiloxane units, or the molar equivalent of other diorganosiloxane units. Within this range, the polysiloxane polycarbonate copolymer may comprise 75 wt % to 98 wt %, specifically 85 wt % to 95 wt % of carbonate units and 2 wt % to 25 wt %, specifically 5 wt % to 15 wt % dimethylsiloxane units, or the molar equivalent of other diorganosiloxane units. In particular embodiments, the amount of dihydroxy polydiorganosiloxane may be selected to produce a copolymer comprising about 1 mole percent to about 60 mole percent of polydiorganosiloxane blocks relative to the moles of polycarbonate blocks, and more generally, about 3 mole percent to about 50 mole percent of polydiorganosiloxane blocks relative to the moles of polycarbonate blocks.

The polysiloxane polycarbonate copolymer has a light transmission greater than or equal to 55%, specifically greater than or equal to 60% and more specifically greater than or equal to 70%. The copolymer also has a haze less than or equal to 45%, preferably less than or equal to 25%, and most specifically less than or equal to 10%. Without being bound by theory, it is believed that on a molecular scale both the transparency and haze of the polysiloxane polycarbonate copolymer are related to the number of polysiloxane units within the polymer chain, the average size of the polysiloxane unit (as defined by the number of repeating siloxane subunits (7)), the random or non-random distribution of the polysiloxane units in the polymer chain, or a combination of one or more of these factors. It is believed that a more random distribution of polysiloxane units within a copolymer provides both a greater degree of transparency and a lesser degree of haze. Reaction conditions, relative amounts of starting materials, and/or types of starting materials may therefore be selected so as to adjust the distribution of the polysiloxane units, and thus the transparency and haze of the composition. For example, U.S. Pat. No. 6,833,422 describes a method for making transparent polysiloxane polycarbonate copolymers by first reacting polycarbonate oligomer with siloxane bischloroformate to produce an intermediate that is subsequently reacted with a biphenol, phosgene and an endcapping reagent. This method produces better transparency than methods wherein the phosgene, the biphenol and the siloxane are simultaneously present (i.e., wherein the siloxane is not "pre-phosgenated" to form the bischloroformate). It is thought that producing the bischloroformate before adding phosgene helps to make a more randomly distributed copolymer due to reactivity differences between siloxanes and biphenols versus phosgene. As described previously, in such methods, the bischloroformate of siloxane bisphenols can be made in a tube reactor as described in U.S. Pat. No. 6,723,864. Specifically, a bischloroformate can be formed by introducing into a flow reactor at least one siloxane bisphenol, at least one alkali metal hydroxide or alkaline earth metal hydroxide, and phosgene, said phosgene being introduced at a rate such that the ratio of phosgene to siloxane bisphenol OH groups is in a range between about 2.5 and about 6 moles of phosgene per mole of siloxane bisphenol OH group, said alkali metal hydroxide or alkaline earth metal hydroxide being introduced as an aqueous solution, said aqueous solution having a concentration of at least about 5 percent by weight metal hydroxide, said metal hydroxide being introduced at a rate such that the molar ratio of metal hydroxide to phosgene is in a range between about 3.5 and about 6. Also, so-called "phase transfer catalyst" methods can be used to generate transparent polysiloxane polycarbonate copolymers. For example, U.S. Pat. No. 5,530,083 discloses a multiple-step method in which an oligomeric polycarbonate is prepared by phosgenating a bisphenol in the presence of a phase transfer catalyst to produce chloroformate-terminated oligomers, then condensing a bis(hydroxyaryl)polyorganosiloxane with the chloroformate in the absence of phosgene, and finally removing excess chloroformate, usually by adding an amine as catalyst.

Another phase transfer method for preparing a copolyorganosiloxanecarbonate comprises: contacting at least one dihydroxyaromatic compound with phosgene, the molar ratio of phosgene to dihydroxyaromatic compound being in the range of about 0.1-0.9:1, in an alkaline mixed aqueous-organic liquid at a pH in the range of about 9-12, in the presence of at least one trialkylamine as the only catalytic species present and, optionally, at least one monohydroxyaromatic compound or chloroformate thereof as chain termination agent, thereby producing an oligomeric aromatic polycarbonate mixture; combining said mixture with a reagent consisting essentially of at least one polyorganosiloxane bis(aryl)chloroformate at a pH in the range of about 10.5 to 13.5, optionally with additional introduction of at least one of (1) phosgene and (2) at least one monohydroxyaromatic compound or chloroformate thereof as chain termination agent, thereby forming a copolyorganosiloxanecarbonate oligomer mixture; and adding phosgene and, optionally, chain termination agent to said copolyorganosiloxanecarbonate-containing mixture to afford a copolyorganosiloxanecarbonate of a desired molecular weight.

Yet another phase transfer catalyst method comprises the steps of:

(A) preparing a bischloroformate reaction mixture by combining a first portion of one or more aromatic dihydroxy compounds with phosgene, a phase transfer catalyst, an aqueous solvent and an organic solvent under interfacial reaction conditions while maintaining the pH in the range of from about 3 to about 8;

(B) adding a portion or all of the hydroxyaryl-terminated polydiorganosiloxane to the resulting mixture of (A), wherein the total hydroxyaryl-terminated polydioranosiloxane is a sufficient amount to satisfy the desired polydiorganosiloxane weight percent requirements in the finally resulting polycarbonate-polysiloxane copolymer;

(C) adjusting the pH of the mixture forward in step (B) to a value in the range of about 10 to about 14 either before, during or after step (B);

(D) subsequently adding one or more of the remaining portions of the total amount of the one or more aromatic dihydroxy compounds, an aqueous solvent and an organic solvent;

(E) optionally repeating the addition of hydroxyaryl-terminated polydiorganosiloxane and/or aromatic dihydroxy compound until the total amount of the one or more aromatic dihydroxy compounds has been added and all of the hydroxyaryl-terminated polydiorganosiloxane has been added;

(F) allowing reaction to occur until 50 ppm or less of residual chloroformates remain;

(G) subsequently adding an agent selected from the group consisting of a chainstopper, a co-phosgenation catalyst and combination thereof, to the resulting mixture of (F); and (H) adding a sufficient amount of phosgene to the resulting mixture of (G), while maintaining a pH of about 9 to about 12, to complete a reaction to form the polycarbonate-polysiloxane copolymer.

The composition includes a styrene-acrylonitrile copolymer (SAN), such as SAN produced in a bulk polymerization process, as known in the art. Bulk polymerized SAN is advantageous due to the absence or minimal presence of additives such as suspending agents, surfactants and the like, which may have an adverse affect on transparency.

Optionally, the SAN may comprise 5 wt % to 30 wt % acrylonitrile by weight of the SAN, for example, 10 wt % to 25 wt % acrylonitrile, optionally 16 wt % to 28 wt % acrylonitrile. In a particular embodiment, the styrene-acrylonitrile copolymer may comprises 75 wt % styrene and 25 wt % acrylonitrile based on the total weight of the SAN copolymer. Optionally, the SAN may comprise not more than 28 wt % acrylonitrile, optionally not more than 25 wt % acrylonitrile.

The refractive index (RI) of SAN varies with variations in the styrene/acrylonitrile weight ratio in the copolymer, as indicated in Table 1.

TABLE 1

| SAN | | |
|---|---|---|
| % acrylonitrile | % Styrene | RI |
| 15 | 85 | 1.5795 |
| 25 | 75 | 1.5725 |
| 25 | 75 | 1.5725 |
| 28 | 72 | 1.5694 |
| 34 | 66 | 1.5662 |
| 35 | 65 | 1.5655 |

It is known in the prior art that transparent blends of polycarbonate with minor amounts of SAN can be achieved by using SAN with a RI close to that of the polycarbonate, e.g., a RI of 1.58. In some embodiments, a composition as described herein may comprise SAN that would form a transparent blend with polycarbonate. However, compositions described herein are transparent even with SAN that would not yield a transparent blend with polycarbonate. For example, a transparent blend of polysiloxane-polycarbonate copolymer and SAN may comprise SAN having a RI of 1.57 or less, even though such SAN would not form a transparent blend with polycarbonate. It is surprising that polysiloxane-polycarbonate copolymer and SAN can form a transparent blend because the RI of polydimethyl siloxane (PDMS) is about 1.4, as indicated in Table 2, which is very different from that of SAN and of polycarbonate, suggesting that a composition comprising a blend of polysiloxane-polycarbonate copolymer and SAN would be opaque, even with SAN that could form a transparent blend with polycarbonate. It is also surprising that PDMS can form a transparent blend with SAN that would not form a transparent blend with polycarbonate.

TABLE 2

| Resin | RI |
|---|---|
| Polycarbonate | 1.58 |
| Polystyrene | 1.59 |
| Polyacrylonitrile | 1.52 |
| Polymethylmethacrylate | 1.49 |
| Polydimethylsiloxane | 1.40 |

The thermoplastic composition may optionally include an impact modifier composition comprising one or more impact modifiers to increase its impact resistance. These impact modifiers include elastomer-modified graft copolymers comprising (i) an elastomeric (i.e., rubbery) polymer substrate having a Tg less than 10° C., more specifically less than −10° C., optionally −40° C. to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Suitable conjugated diene monomers for preparing the elastomer phase are of formula (14):

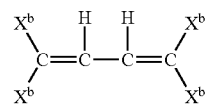

(14)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (15):

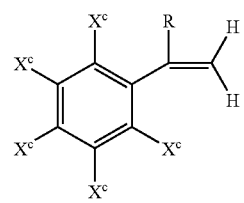

(15)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (16):

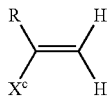

(16)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl (meth) acrylate, ethyl (meth)acrylate, n-butyl (meth)acrylate, t-butyl (meth)acrylate, n-propyl (meth)acrylate, isopropyl (meth) acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt % of comonomers of formulas (14), (15), or (16). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of 0.001 micrometers (μm) to 25 μm, specifically 0.01 μm to 15 μm, or even more specifically 0.1 μm to 8 μm may be used for emulsion based polymerized rubber lattices. A particle size of 0.5 μm to 10 μm, specifically 0.6 μm to 1.5 μm may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide 5 wt % to 95 wt % of the total graft copolymer, more specifically 20 wt % to 90 wt %, and even more specifically 40 wt % to 85 wt % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (ii) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (16). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt % of monovinyl aromatic monomer, for example, 30 wt % to 100 wt %, optionally 50 wt % to 90 wt % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise 40 wt % to 95 wt % elastomer-modified graft copolymer and 5 wt % to 65 wt % graft (co)polymer, based on the total weight of the impact modifier. In another embodiment, such impact modifiers comprise 50 wt % to 85 wt %, more specifically 75 wt % to 85 wt % rubber-modified graft copolymer, together with 15 wt % to 50 wt %, more specifically 15 wt % to 25 wt % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (ii) or (iii), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and an tetraethoxyorthosilicate may be reacted with a first graft link monomer such as (gamma-methaacryloxypropyl) methyldimethoxysilane, to afford silicone rubber having an average particle size from 100 nanometers to 2 micrometers. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

In one embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents such as U.S. Pat. No. 6,545,089. In the practice, any of the above-described impact modifiers may be used providing it is free of the alkali metal salts of fatty acids, alkali metal carbonates and other basic materials.

A specific impact modifier of this type is an MBS impact modifier wherein the butadiene substrate is prepared using above-described sulfonates, sulfates, or phosphates as surfactants. It is also preferred that the impact modifier have a pH of 3 to 8, specifically 4 to 7.

Optionally, the compositions described herein may be substantially free of polymeric resins that are nontransparent in their uncompounded state, i.e., when not blended with another polymeric resin. The composition may also be substantially free of polymeric resins that would not form a transparent blend with the polysiloxane-polycarbonate copolymer and SAN. For example, the composition may be substantially free of ABS. Without wishing to be bound be theory, it is believed that the rubber domain of ABS has an average size of 250 nanometers (nm) to 500 nm or larger measured by transmission electron microscopy or laser diffraction particle size analyzer, a size that would refract light to render the composition excessively hazy to be transparent. Accordingly, the composition may optionally be free of polymeric materials having refractive domains in the composition, e.g., domains 250 nm in size or greater. Optionally, the composition may be free of additives that render the composition opaque or result in a haze of more than 45% or a transmission of less than 55%.

The thermoplastic composition may also include various additives ordinarily incorporated in resin compositions of this type, with the proviso that the additives are preferably selected so as to not significantly adversely affect the desired properties of the thermoplastic composition. Mixtures of additives may be used. Such additives may be mixed at a suitable time during the mixing of the components for forming the composition.

Suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from combinations comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly (phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to 90 parts by weight, based on 100 parts by weight of the total polymer content of the composition ( polysiloxane-polycarbonate copolymer, SAN, polycarbonate (if any), and any impact modifier or other polymer component).

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 parts by weight, based on 100 parts by weight of the total polymer content of the composition.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB 5411); 2-hydroxy-4-n-octyloxybenzophenone (CYASORB 531); 2-[4,6-bis(2,4-dimethylphenyl)-1,3,5-triazin-2-yl]-5-(octyloxy)-phenol (CYASORB 1164); 2,2'-(1,4-phenylene)bis(4H-3,1-benzoxazin-4-one) (CYASORB UV-3638); 1,3-bis[(2-cyano-3,3-diphenylacryloyl)oxy]-2,2-bis[[(2-cyano-3, 3-diphenylacryloyl)oxy]methyl]propane (UVINUL 3030); 2,2'-(1,4-phenylene) bis(4H-3,1-benzoxazin-4-one); 1,3-bis[(2-cyano-3,3-diphenylacryloyl)oxy]-2, 2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations comprising at least one of the foregoing UV absorbers. UV absorbers are generally used in amounts of 0.0001 to 1 parts by weight, based on 100 parts by weight of the total polymer content of the composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of 0.0001 part by weight to 1 part by weight, based on 100 parts by weight of the total polymer content of the composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, perfluorinated sulfonate salts such as tetra-n-butylphosphonium perfluorobutylsulfonate, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol units polyalkylene oxide units such as polyethylene glycol, polypropylene glycol, polytetramethylene glycol, and the like. Such polymeric antistatic agents are commercially available, for example Pelestat 6321 (Sanyo) or Pebax MH1657 (Atofina), Irgastat P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative.

Antistatic agents are generally used in amounts of 0.0001 parts by weight to 5 parts by weight, based on 100 parts by weight of the total polymer content of the composition.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of 0.01 parts by weight to 10 parts by weight, based on 100 parts by weight of the total polymer content of the composition.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly (C2-8) olefin dyes; carbocyanine dyes; indanthrone dyes; phthalocyanine dyes; oxazine dyes; carbostyryl dyes; napthalenetetracarboxylic acid dyes; porphyrin dyes; bis (styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone- 2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylene-bis(5-phenyloxazole); rhodamine 700; rhodamine 800; pyrene; chrysene; rubrene; coronene, or the like, or combinations comprising at least one of the foregoing dyes. Dyes are generally used in amounts of 0.01 parts by weight to 10 parts by weight, based on 100 parts by weight of the total polymer content of the composition.

Radiation stabilizers may also be present, specifically gamma-radiation stabilizers. Suitable gamma-radiation stabilizers include diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,2-cyclopentanediol, 1,2-cyclohexanediol, and the like; branched acyclic diols such as 2,3-dimethyl-2,3-butanediol (pinacol), and the like, and polyols, as well as alkoxy-substituted cyclic or acyclic alkanes. Alkenols, with sites of unsaturation, are also a useful class of alcohols, examples of which include 4-methyl-4-penten-2-ol, 3-methyl-pentene-3-ol, 2-methyl-4-penten-2-ol, 2,4-dimethyl-4-pene-2-ol, and 9-decen-1-ol. Another class of suitable alcohols is the tertiary alcohols, which have at least one hydroxy substituted tertiary carbon. Examples of these include 2-methyl-2,4-pentanediol (hexylene glycol), 2-phenyl-2-butanol, 3-hydroxy-3-methyl-2-butanone, 2-phenyl-2-butanol, and the like, and cycoloaliphatic tertiary carbons such as 1-hydroxy-1-methyl-cyclohexane. Another class of suitable alcohols is hydroxymethyl aromatics, which have hydroxy substitution on a saturated carbon attached to an unsaturated carbon in an aromatic ring. The hydroxy substituted saturated carbon may be a methylol group (—CH$_2$OH) or it may be a member of a more complex hydrocarbon group such as would be the case with (—CR$^4$HOH) or (—CR$_2^4$OH) wherein R$^4$ is a complex or a simply hydrocarbon. Specific hydroxy methyl aromatics may be benzhydrol, 1,3-benzenedimethanol, benzyl alcohol, 4-benzyloxy benzyl alcohol and benzyl benzyl alcohol. Specific alcohols are 2-methyl-2,4-pentanediol (also known as hexylene glycol), polyethylene glycol, polypropylene glycol. Gamma-radiation stabilizing compounds are typically used in amounts of 0.001 wt % to 1 wt %, more specifically 0.01 wt % to 0.5 wt %, based on the total weight of the total polymer content of the composition.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula (GO)$_3$P═O, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

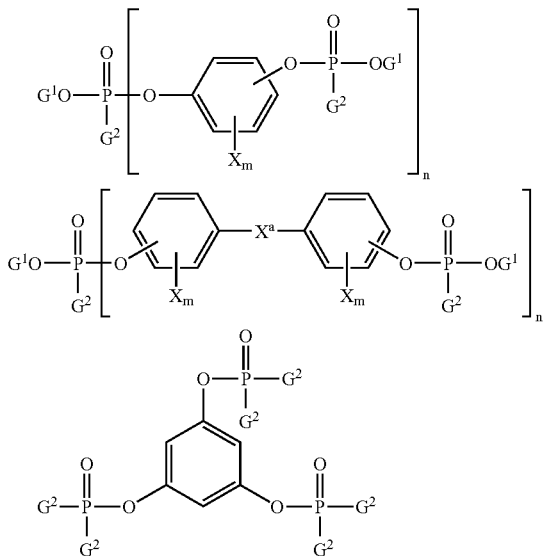

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of 0.001 to 10 parts by weight, or further can be present in amounts of 0.01 to 5 parts by weight, based on 100 parts by weight of the total polymer content of the composition.

Halogenated materials may also be used as flame retardants, for example halogenated compounds and resins of formula (17):

(17)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (17) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally present in amounts of 0.001 parts by weight to 10 parts by weight, or can be present in amounts of 0.01 parts by weight to 5 parts by weight, based on 100 parts by weight of the total polymer content of the composition.

Inorganic flame retardants may also be used, for example salts of C2-16 alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of 0.001 to 10 parts by weight, and further can be present in amounts of 0.01 to 5 parts by weight, based on 100 parts by weight, based on 100 parts by weight of polysiloxane-polycarbonate copolymer and SAN. Optionally, the compositions described herein may be substantially free of an additive or quantity of additive that renders the composition nontransparent.

These thermoplastic compositions may be manufactured by methods generally available in the art, for example, in one embodiment, in one manner of proceeding, powdered polysiloxane-polycarbonate copolymer, SAN and/or other optional components are first combined in a Henschel high speed mixer. Other low shear processes including but not limited to hand mixing may also accomplish this blending. The blend is then fed into the throat or feedthroat of a twin-screw extruder via a hopper. Alternatively, one or more of the components may be incorporated into the composition by feeding directly into the extruder at the throat and/or downstream through a sidestuffer or feedport. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

The polycarbonate-polysiloxane copolymer/SAN and optional polycarbonate compositions as described herein can be used to form optical articles and shaped articles, including thin-walled articles, e.g., articles comprising a wall or film having a thickness of 3.2 millimeters (mm) or less, optionally less than 1.5 mm or, e.g., 1 mm to 1.5 mm. The compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, medical devices, membrane devices, and components of lighting fixtures, ornaments, home appliances, roofs, greenhouses, sun rooms, swimming pool enclosures, and the like. They can be used in blow molding processes like extrusion blow molding or injection stretch blow molding for the production of hollow products like bottles. Also, they can be used in extrusion processes for the production of profiles, solid sheets, multi-wall sheets, corrugated sheets and oriented films. The compositions are suitable to commercial applications that require good impact resistance, particularly at lower temperature, good weatherability properties and chemical resistance. Films comprising these compositions have good water and oxygen permeability characteristics for use as food storage wrappings.

Other embodiments include articles comprising any of the above-described compositions. For example, the article may comprise a film, sheet, molded object, membrane, or composite, wherein the film, sheet, molded object or composite has at least one layer comprising the composition. Compositions of the invention may be converted to articles using common thermoplastic processes such as film and sheet extrusion, injection molding, gas-assist injection molding, extrusion molding, compression molding, blow molding, and the like. Film and sheet extrusion processes may include melt casting, blown film extrusion, and calendaring. Co-extrusion and lamination processes may be employed to form composite multi-layer films or sheets. Single or multiple layers of coatings may further be applied to the single or multi-layer substrates to impart additional properties such as, but not limited to, scratch resistance, ultraviolet light resistance, aesthetic appeal, lubricity, and biocompatibility. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt or roll followed by removal of the solvent.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as follows: (1) Providing a single or multi-layer thermoplastic substrate having optionally one or more colors on the surface, for instance, using screen printing or a transfer dye; (2) Conforming the substrate to a mold configuration such as by forming and trimming a substrate into a three dimensional shape and fitting the substrate into a mold having a surface which matches the three dimensional shape of the substrate; (3) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

In one embodiment, the composition (or articles prepared therefrom) may exhibit a percent light transmission of at least 55%, optionally at least 70%, measured according to ASTM D1003-61 at a thickness of 3.2 millimeters.

A composition as described herein may have a percent haze of less than or equal to 45%, optionally less than or equal to 20%, measured according to ASTM D1003-61 at a thickness of 3.2 millimeters.

A composition as described herein may have a melt flow volume rate (MVR) of 1 cm$^3$/10 minutes to 30 cm$^3$/10 minutes, optionally 2 cm$^3$/10 minutes to 20 cm$^3$/10 minutes, measured at 300° C./1.2 kg in accordance with ASTM D1238-04.

The Vicat softening temperature gives a measure of the temperature at which a plastic starts to soften rapidly, and is reported as the temperature at which a flat-ended needle penetrates a specimen under a load of 10N (method A) or 50N (method B) to a depth of 1 mm. The test specimen must be between 3 mm and 6.5 mm thick and at least 10 mm in width and length. The temperature reflects the point of softening to be expected when a material is used in an elevated temperature application. The test specimen is placed in the testing apparatus so that the penetrating needle rests on its surface at least 1 mm from the edge and the load is applied to the specimen. The specimen is then lowered into an oil bath at a temperature of 23° C. which is raised at a specified rate until the needle penetrates 1 mm. Compositions described in the following example have a Vicat softening temperature of 120° C. to 150° C., optionally 130° C. to 145° C., under a 50N load and with a rate of temperature increase of 120° C./hour.

In some embodiments, the compositions may have a % tensile elongation of 80% to 120%, optionally 90% to 115%, measured in accordance with ASTM 256-04.

EXAMPLES

Various compositions were prepared from the components set forth in the following Table 3. In Table 3, "AN" means acrylonitrile.

TABLE 3

| Component | Description | Molecular Weight (gram/mol) or Viscosity |
|---|---|---|
| PC-1 | Polycarbonate | 30,000 |
| PC-2 | Polycarbonate | 21,800 |
| EXL-1 | Transparent polysiloxane-polycarbonate copolymer; 6% PDMS | 23,500 |
| EXL-2 | Opaque polysiloxane-polycarbonate copolymer; 20% PDMS | 30,000 |
| H3PO3 | Phosphorous acid, 0.15%" Acid stabilization solution | NA |
| PCCD | PCCD, poly(1,4-cyclohexylenedimethylene 1,4-cyclohexanedicarboxylate) | 0.97 dL/g intrinsic viscosity |
| SAN-1 | Styrene-acrylonitrile polymer; 25% AN | 65,000 |
| SAN-2 | Styrene-acrylonitrile polymer; 24% AN | 93,000 |
| SAN-3 | Styrene-acrylonitrile polymer; 28% AN | 100,000 |
| SAN-4 | Suspension Styrene-acrylonitrile polymer; 35% AN | 3,300 poise melt viscosity |

SAN-1, SAN-2 and SAN-3 were prepared in a bulk polymerization process. SAN-4 was prepared in a suspension polymerization process.

Sample compositions were prepared using the components of Table 3 in the proportions set forth in the following Table 4. In those samples comprising polycarbonate, PC-2 was used, except in sample 20, where PC-1 was used.

TABLE 4

| Sample | PC | Clear EXL | Opaque EXL | Phosphorous acid, 0.15 wt % aqueous solution | PCCD | SAN-1 | SAN-2 | SAN-3 | SAN-4 |
|---|---|---|---|---|---|---|---|---|---|
| 1 |  | 98 |  |  |  | 2 |  |  |  |
| 2 |  | 98 |  | 0.1 |  | 2 |  |  |  |
| 3 |  | 91.5 |  |  |  | 8.5 |  |  |  |
| 4 |  | 85 |  |  |  | 15 |  |  |  |
| 5 |  | 85 |  | 0.1 |  | 15 |  |  |  |
| 6 | 20 | 70 |  |  |  | 10 |  |  |  |
| 7 | 45 | 45 |  |  |  | 10 |  |  |  |
| 8 | 70 | 20 |  |  |  | 10 |  |  |  |
| 9 | 72.5 |  | 25.5 |  |  | 2 |  |  |  |
| 10 | 100 |  |  |  |  |  |  |  |  |
| 11 |  | 85 |  |  |  |  | 15 |  |  |
| 12 |  | 85 |  |  |  |  |  | 15 |  |
| 13 |  | 85 |  |  |  |  |  |  | 15 |
| 14 |  | 91.5 |  |  |  |  |  |  | 8.5 |
| 15 |  | 85 | 15 | 0.188 | 10 |  |  |  |  |
| 16 | 85 |  |  |  |  |  |  |  |  |
| 17 |  | 85 |  |  |  |  |  |  |  |
| 18 |  | 90 |  |  |  | 10 |  |  |  |
| 19 |  | 80 |  |  |  | 20 |  |  |  |
| 20 | 80 |  |  |  |  | 20 |  |  |  |
| 21 | 80 |  |  |  |  | 20 |  |  |  |

All sample compositions were prepared batchwise, by blending the indicated components and extruding them on a four zone, 30 millimeter (mm) twin screw extruder, with typical zone temperatures of 480° F., 520° F., and 540° F. for zones 1 through 3, respectively, and a die temperature of 550° F.

All compositions were compounded on 30 mm co-rotating twin screw extruder. The twin-screw extruder had enough distributive and dispersive mixing elements to produce good mixing between the polymer compositions. The compositions are subsequently molded on a 90-ton Van Dorn injection molding machine. The sample compositions were molded from a four-zone extruder into test samples having a thickness of 3.2 mm (0.125 inch).

The compositions are tested for their processing behavior, Izod impact strength, tensile and optical properties. Specifically, samples were tested for the following properties: Melt flow rate (MFR) was tested according to ASTM D 1238-04 at 300° C. for 6 minutes using a weight of 1.2 kilograms. High shear viscosity was tested at 290° C., 640 s$^{-1}$. Notched Izod Impact strength and % ductility were measured according to ASTM D256-04 and 3.12 millimeter thick test bars and at various temperatures (see ASTM D256-04 for NI testing at 23° C.). Yellowness Index was determined according to ASTM-1003-61 on 3.2 mm thick molded plaques (chips). Haze (%) and light transmission (%) were determined according to ASTM D1003-61 using a Gardner Haze Guard Dual, on 3.2 millimeter thick chips.

Table 5 below summarizes the tests to which samples were subjected.

TABLE 5

| Test | Standard | Condition |
|---|---|---|
| YI | ASTM D 1003-61 | N/A |
| Transmission | ASTM D 1003-61 on 125 mil (3.2 mm) chips | N/A |
| Haze | ASTM D 1003-61 on 125 mil (3.2 mm) chips | N/A |
| MFR | ASTM D1238-04 | 300° C./1.2 kgf |
| High Shear Viscosity | | 290° C., 640 s$^{-1}$ |
| Izod ("NII") | ASTM D256-04 | notched, RT and −20° C. |
| Tensile | ASTM D638 | N/A |

The test results are set forth in Table 6, with the test samples numbered according to the compositions from which they were molded.

carbonate. For example, optical improvement is further evidenced by visual inspection of samples 18-21, which showed that samples 18 and 19, both of which comprised EXL-1 and SAN, were transparent while samples 20 and 21 (both of comprised PC/SAN) were opaque.

The data of Table 6 also shows that a transparent composition of polysiloxane-polycarbonate copolymer and SAN can also contain 0.1 wt % to 20 wt % polycarbonate, and the data indicate that transparent compositions may comprise up to 50 wt % polycarbonate.

The effect of phosphorous acid on haze is seen by comparing the % haze data for samples 1 and 2 and samples 4 and 5. The sample pairs (1,2) and (4,5) were identical in formulation (see Table 4) except for the inclusion of the phosphorous acid stabilizer in samples 2 and 5. There was no significant haze difference seen between the stabilized and unstabilized formulations, although a slight decrease in YI for the stabilized formulations is evident.

Samples 9 and 15 comprised opaque polysiloxane-polycarbonate copolymer resin instead of part or all of the transparent copolymer resin.

While some polysiloxane-polycarbonate copolymer/SAN blends exhibit a higher degree of transparency than the corresponding polycarbonate/SAN blends, the degree of improvement varies by SAN grade. In some embodiments, superior transmission is seen with SAN comprising not more than 25 wt % acrylonitrile. The combination of polysiloxane-polycarbonate copolymer and lower nitrile SAN in a transparent flow-promoted product also exhibits improved formulation robustness in that polysiloxane-polycarbonate copolymer/SAN blends retain transparency over a larger range of SAN levels than the corresponding polycarbonate/SAN blends.

The compositions described herein comprise SAN and thus exhibit improved physical properties and yet remain

TABLE 6

| Sample | Melt Flow Rate g/10 min | High Shear Viscosity Pa-s at 640 s$^{-1}$, 290° C. | 23° C. NII lbf/in | −20° C. NII lbf/in | Tensile Modulus PSI | Tensile Stress Yield - PSI | Tensile Stress at Break - PSI | Tensile Elongation Yield % | Tensile Elongation at Break - % | Vicat ° C. (50 N, 120° C./ hour) | Yellowness Index - YI- | % Transmission | % Haze |
|---|---|---|---|---|---|---|---|---|---|---|---|---|---|
| 1 | 10.64 | 327.6 | 13.582 | 11.624 | 311000 | 8240 | 7490 | 5.70 | 99.82 | 139 | 12.7 | 84 | 5.9 |
| 2 | 10.83 | 322.2 | 13.515 | 11.933 | 314000 | 8270 | 7420 | 5.68 | 101.98 | 139 | 11.8 | 84 | 3.8 |
| 3 | 13.74 | 189.7 | 11.391 | 9.503 | 336000 | 8610 | 8010 | 5.44 | 113.92 | 135 | 13.7 | 83 | 26 |
| 4 | 16.84 | 168.9 | 4.084 | 1.540 | 358000 | 8930 | 7060 | 5.20 | 91.96 | 131 | 14.1 | 81 | 31 |
| 5 | 16.87 | 168.4 | 4.027 | 1.364 | 355000 | 8990 | 6930 | 5.16 | 80.12 | 131 | 13.6 | 81 | 39 |
| 6 | 19.67 | 197.6 | 11.507 | 4.352 | 350000 | 8800 | 8740 | 5.38 | 126.16 | 137 | 15.0 | 80 | 55 |
| 7 | 23.88 | 183.5 | 5.110 | 2.642 | 354000 | 8920 | 7890 | 5.46 | 109.96 | 138 | 19.3 | 75 | 80 |
| 8 | 29.89 | 174.9 | 2.812 | 2.361 | 360000 | 9050 | 8790 | 5.72 | 119.40 | 141 | 22.1 | 69 | 89 |
| 9 | 14.35 | 302.7 | 14.192 | 12.361 | 308000 | 8020 | 8350 | 5.68 | 114.32 | 144 | 60.2 | 25 | 99 |
| 10 | 25.85 | 268.0 | 13.446 | 6.323 | 340000 | 8900 | 9490 | 6.28 | 127.58 | 146 | 1.90 | 89 | 0.76 |
| 11 | 13.90 | 235.0 | 10.337 | 4.239 | 367000 | 9010 | 6970 | 5.12 | 84.92 | 134 | 15.2 | 81 | 35 |
| 12 | 20.1 | 257.7 | 10.393 | 2.754 | 360000 | 8900 | 7000 | 5.22 | 81.88 | 134.6 | 15.9 | 80 | 62 |
| 13 | 14.10 | 259.4 | 6.953 | 1.731 | 365000 | 9010 | 7010 | 5.16 | 96.20 | 135 | 26.7 | 71 | 91 |
| 14 | 13.02 | 296.7 | 12.802 | 4.352 | 340000 | 8680 | 7460 | 5.38 | 110.34 | 138 | 24.1 | 73 | 74 |
| 15 | 11.53 | 358.4 | 14.912 | 12.729 | 277000 | 7720 | 7140 | 5.58 | 104.20 | 133 | 34.2 | 56 | 44 |
| 16 | 28.90 | 199.3 | 1.191 | 0.634 | 401000 | 9470 | 8080 | 5.64 | 108.72 | 139.4 | 42.4 | 29 | 99 |
| 17 | 12.30 | 258.3 | 10.315 | 2.341 | 363000 | 8880 | 7080 | 5.18 | 108.54 | 132 | 37.9 | 36 | 99 |
| 18 | 17.6 | | 1.6 | | | | | | | 15 | | 82 | 28.6 |
| 19 | 23.3 | | 0.8 | | | | | | | 16.5 | | 79.9 | 34.3 |
| 20 | 11.9 | | 0.6 | | | | | | | 26.1 | | 60.3 | 98.1 |
| 21 | 42 | | 0.3 | | | | | | | 25 | | 57.7 | 98.1 |

The data of Table 6 shows that contrary to polycarbonate-SAN blends, blends of transparent polysiloxane-polycarbonate copolymer with SAN yield transparent materials, even with SAN that would not form a transparent blend with polycarbonate despite the different refractive indices of SAN and polysiloxane-polycarbonate copolymer. Blends of polysiloxane-polycarbonate copolymers and SAN resins are possible for a wide variety of SAN compositions, with good mechanical properties. In some embodiments, these compositions may comprise significant proportions of polycarbonate as well.

As used herein, the terms "first," "second," and the like do not denote any order or importance, but rather are used to distinguish one element from another, and the terms "the", "a" and "an" do not denote a limitation of quantity, but rather denote the presence of at least one of the referenced item. All ranges disclosed herein for the same property or material are inclusive and combinable (e.g., ranges of "up to 25 wt %, with 5 wt % to 20 wt % desired," is inclusive of the endpoints and all intermediate values of the ranges of "5 wt % to 25 wt %," etc.). All cited patents, patent applications, and other references are incorporated herein by reference in their entirety.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising:
a transparent polysiloxane-polycarbonate copolymer comprising 2 wt % to 10 wt % siloxane, wherein the transparent polysiloxane-polycarbonate copolymer comprises polydiorganosiloxane units of formula (10):

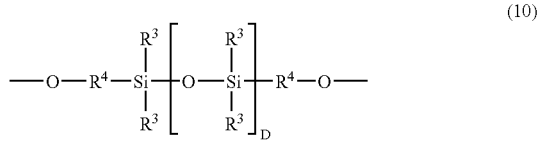

(10)

wherein each occurrence of $R^3$ is the same or different and is selected from $C_{1-13}$ monovalent organic radicals, each occurrence of $R^4$ is independently a divalent $C_1$-$C_{30}$ hydrocarbon, and D is 1 to 1,000; and
styrene-acrylonitrile copolymer (SAN);
and, optionally, polycarbonate;
wherein the SAN comprises not more than 25 wt % acrylonitrile, and the composition is transparent, having a haze of not more than 45% and a light transmission of at least 55%, per ASTM-D1003-61.

2. The composition of claim 1, comprising 0.1 wt % to 50 wt % SAN.

3. The composition of claim 2, comprising 0.1 wt % to 20 wt % SAN.

4. The composition of claim 1, comprising 0.1 wt % to 20 wt % polycarbonate.

5. The composition of claim 1, wherein the polysiloxane-polycarbonate copolymer comprises 4 wt % to 8 wt % siloxane.

6. The composition of claim 1, comprising at least 50 wt % polysiloxane-polycarbonate copolymer.

7. The composition of claim 1, comprising more than 0.5 wt % to 20 wt % SAN.

8. The composition of claim 1, wherein the SAN has a refractive index of not more than 1.57.

9. The composition of claim 1, having a haze of not more than 10% per ASTM-D1003-61.

10. The composition of claim 1, having a light transmission of at least 60% per ASTM-D-1003-61.

11. An article comprising the composition of claim 1.

12. The composition of claim 1, wherein each occurrence of $R^4$ independently has structure (11):

(11)

wherein each occurrence of $R^6$ is independently H or $C_1$-$C_{12}$ hydrocarbyl, each $R^5$ is the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, b is 1 to 8, a is independently 0, 1, 2, 3, or 4, and when a is less than 4, a hydrogen is substituted to the aromatic ring such that the total number of hydrogens on the aromatic ring is 4-a, and the aryl end of formula (11) has connectivity to an oxygen atom, and the alkyl end of formula (11) has connectivity to a silicon atom.

13. A method for making a composition, consisting essentially of combining a transparent polysiloxane-polycarbonate copolymer comprising 2 wt % to 10 wt % siloxane, wherein the transparent polysiloxane-polycarbonate copolymer comprises polydiorganosiloxane units of formula (10):

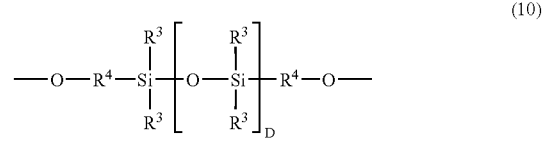

(10)

wherein each occurrence of $R^3$ is the same or different and is selected from $C_{1-13}$ monovalent organic radicals, each occurrence of $R^4$ is independently a divalent $C_1$-$C_{30}$ hydrocarbon, and D is 1 to 1,000, with styrene-acrylonitrile copolymer (SAN), wherein the SAN comprises not more than 25 wt % acrylonitrile, and, optionally, polycarbonate, to produce a transparent composition, having a haze of not more than 45% and a light transmission of at least 55%, per ASTM-D1003-61.

14. The method of claim 13, wherein the composition comprises 0.1% to 50 wt % SAN and up to 20 wt % polycarbonate.

15. A method for making an article, comprising making a composition having a haze of not more than 45% and a light transmission of at least 55% per ASTM-D1003-61, by combining a transparent polysiloxane-polycarbonate copolymer comprising 2 wt % to 10 wt % siloxane, wherein the transparent polysiloxane- polycarbonate copolymer comprises polydiorganosiloxane units of formula (10):

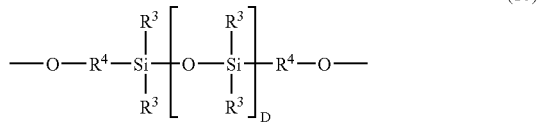
(10)

wherein each occurrence of $R^3$ is the same or different and is selected from $C_{1-13}$ monovalent organic radicals, each occurrence of $R^4$ is independently a divalent $C_1$-$C_{30}$ hydrocarbon, and D is 1 to 1,000,
styrene-acrylonitrile copolymer (SAN) wherein the SAN comprises not more than 25 wt % acrylonitrile, and,
optionally, polycarbonate, and
forming the composition into an article.

16. The method of claim 15, wherein the composition comprises 0.1% to 50% SAN and up to 20 wt % polycarbonate.

17. The method of claim 15, wherein the composition comprises 0.1 wt % to 20 wt % SAN.

18. A composition consisting essentially of:
a transparent polysiloxane-polycarbonate copolymer comprising 2 wt % to 10 wt % siloxane; and
styrene-acrylonitrile copolymer (SAN);
and, optionally, polycarbonate;
wherein the SAN comprises not more than 25 wt % acrylonitrile, and the composition is transparent, having a haze of not more than 45% and a light transmission of at least 55%, per ASTM-D1003-61.

* * * * *